United States Patent
Berezhnyy et al.

(10) Patent No.: US 8,678,067 B2
(45) Date of Patent: Mar. 25, 2014

(54) POSTURE-ADJUSTABLE SOLAR-COLLECTING WINDOW BLIND

(75) Inventors: Igor Berezhnyy, Eindhoven (NL); Elmo Marcus Attila Diederiks, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 34 days.

(21) Appl. No.: 13/142,287

(22) PCT Filed: Dec. 22, 2009

(86) PCT No.: PCT/IB2009/055894
§ 371 (c)(1),
(2), (4) Date: Jun. 27, 2011

(87) PCT Pub. No.: WO2010/076738
PCT Pub. Date: Jul. 8, 2010

(65) Prior Publication Data
US 2011/0265851 A1    Nov. 3, 2011

(30) Foreign Application Priority Data
Dec. 30, 2008   (CN) .......................... 2008 1 0190299

(51) Int. Cl.
*E05F 15/20* (2006.01)
(52) U.S. Cl.
USPC ........................ 160/1; 160/5; 49/64
(58) Field of Classification Search
USPC ......... 160/1, 2, 5, 7; 49/80.1, 74.1, 92.1, 77.1
See application file for complete search history.

(56) References Cited

U.S. PATENT DOCUMENTS

| | | | | |
|---|---|---|---|---|
| 345,690 A | * | 7/1886 | Hayes | 49/64 |
| 345,691 A | * | 7/1886 | Hayes | 49/64 |
| 3,039,155 A | * | 6/1962 | Iacovoni | 49/65 |
| 4,137,098 A | * | 1/1979 | Field | 136/248 |
| 4,159,710 A | * | 7/1979 | Prast | 126/582 |
| 4,644,990 A | * | 2/1987 | Webb et al. | 160/5 |
| 4,727,918 A | * | 3/1988 | Schroeder | 160/5 |
| 5,142,133 A | * | 8/1992 | Kern et al. | 250/203.4 |
| 5,221,363 A | * | 6/1993 | Gillard | 136/248 |
| 5,413,161 A | * | 5/1995 | Corazzini | 160/7 |
| 5,532,560 A | * | 7/1996 | Element et al. | 318/266 |
| 5,598,000 A | * | 1/1997 | Popat | 250/206 |
| 5,648,656 A | * | 7/1997 | Begemann et al. | 250/214 AL |
| 5,663,621 A | * | 9/1997 | Popat | 318/480 |
| 5,675,487 A | * | 10/1997 | Patterson et al. | 700/56 |
| 5,760,558 A | * | 6/1998 | Popat | 318/480 |
| 6,378,248 B1 | * | 4/2002 | Jordal | 49/80.1 |
| 7,077,123 B2 | * | 7/2006 | Jarvinen | 126/573 |
| 7,192,146 B2 | * | 3/2007 | Gross et al. | 359/853 |
| 7,242,162 B2 | * | 7/2007 | Goth | 318/480 |
| 7,417,397 B2 | * | 8/2008 | Berman et al. | 318/468 |

(Continued)

*Primary Examiner* — Katherine Mitchell
*Assistant Examiner* — Johnnie A Shablack
(74) *Attorney, Agent, or Firm* — Larry Liberchuk

(57) ABSTRACT

The present invention proposes a posture-adjustable solar-collecting window blind, which can adjust the position of solar cells to better collect solar energy. In the window blind, a solar detector and an ampere meter are used to detect the relationship between the incident angle of sunlight and an optimal arrangement of the solar detector. The relationship can be further used to adjust the positions of the plurality of solar cells. Furthermore, the window blind comprises a light sensor to detect the light intensity of a target area, which can be complementarily used to adjust the position of the plurality of solar cells.

13 Claims, 2 Drawing Sheets

(56) References Cited

U.S. PATENT DOCUMENTS

| | | | |
|---|---|---|---|
| 7,466,090 B2* | 12/2008 | Meewis et al. | 318/280 |
| 7,501,572 B1* | 3/2009 | Rabinowitz | 136/246 |
| 7,617,857 B2* | 11/2009 | Froese | 160/10 |
| 7,923,948 B2* | 4/2011 | Rodas et al. | 318/266 |
| 7,977,904 B2* | 7/2011 | Berman et al. | 318/480 |
| 8,230,649 B2* | 7/2012 | Kapany | 52/171.3 |
| 8,245,444 B2* | 8/2012 | Konstantin et al. | 49/82.1 |
| 8,365,468 B2* | 2/2013 | Weekes | 49/92.1 |
| 8,365,800 B2* | 2/2013 | Oh et al. | 160/168.1 P |
| 8,413,705 B2* | 4/2013 | Castel | 160/107 |
| 8,528,621 B2* | 9/2013 | Murphy et al. | 160/5 |
| 8,534,008 B1* | 9/2013 | Konstantin | 52/173.3 |
| 2006/0288645 A1* | 12/2006 | Konstantino et al. | 49/92.1 |
| 2007/0175599 A1* | 8/2007 | Froese | 160/168.1 R |
| 2007/0221338 A1* | 9/2007 | Meewis et al. | 160/7 |
| 2007/0251569 A1* | 11/2007 | Shan et al. | 136/246 |
| 2009/0222137 A1* | 9/2009 | Berman et al. | 700/275 |
| 2010/0154999 A1* | 6/2010 | Oh et al. | 160/7 |
| 2010/0243025 A1* | 9/2010 | Bhatia et al. | 136/244 |
| 2011/0214712 A1* | 9/2011 | Frazier et al. | 136/248 |
| 2011/0220299 A1* | 9/2011 | Berman et al. | 160/5 |
| 2011/0251720 A1* | 10/2011 | Neuman | 700/275 |
| 2012/0029704 A1* | 2/2012 | Ackermann | 700/275 |
| 2012/0125543 A1* | 5/2012 | Chambers et al. | 160/5 |
| 2012/0216964 A1* | 8/2012 | Xu | 160/6 |

* cited by examiner

POSTURE-ADJUSTABLE SOLAR-COLLECTING WINDOW BLIND

FIELD OF THE INVENTION

The present invention relates to window blinds capable of collecting solar energy, in particular window blinds comprising posture-adjustable solar panels.

BACKGROUND OF THE INVENTION

Windows are an important part of our houses. One of their main functions is to allow sunlight to pass into the inside of houses or block the entrance of sunlight. Recently ideas have been developed for installing solar panels in windows to collect solar energy and convert it into electricity. Among them, SHARP's LumiWall product combines solar power generation, daylight transmission and illumination. In a LumiWall product, a number of thin-film solar panels are embedded inside the glass to convert solar energy into electricity during daytime hours, and provide illumination as white-LED during nighttime. A LumiWall product will not really generate much electricity for use in house; its aim is to create an aesthetically-pleasing, self-contained illumination device.

However, among all the available solutions, there is no solution for window installation, especially window blinds, such that autonomous optimization of the shape/position/posture takes place for best solar energy collection and conversion.

SUMMARY OF THE INVENTION

It is a first object, according to embodiments of the present invention, to propose a posture-adjustable window blind for improving the solar-collection efficiency, especially adjusting postures of solar cells mounted on the window blind, depending on the incidence angle of sunlight.

According to an embodiment of the present invention, a window blind is proposed that comprises a solar detector, an ampere meter, a plurality of solar cells and a motor. In said embodiment, the solar detector is configured to collect solar energy, the ampere meter is configured to measure the output current of the solar detector to find an optimal arrangement of the solar detector corresponding to the maximum output current or an expected output current, each of the plurality of solar cells is configured to be mounted on a corresponding slat of the window blind and collect solar energy and convert it into electricity, and the motor is configured to adjust the postures, especially the tilt angles, of the plurality of solar cells, based on the optimal arrangement of the solar detector.

In this proposed window blind, the solar detector and the ampere meter can be used to determine the relationship between the arrangement of the solar detector, the incidence angle of the sunlight and the conversion efficiency of the solar energy. The arrangement of the solar detector can be its shape, tilt angle, position, or posture. Furthermore, the relationship can be used to adjust the postures of the solar cells to maximize the collection of solar energy or to collect solar energy on demand.

Preferably, the solar detector can be located at a substantially central area of the region formed by the plurality of solar cells, for providing closer information, for example on the influence of the incidence angle of sunlight on solar energy collection, for better adjusting the posture of the plurality of solar cells.

Preferably, the solar detector can be in the shape of a wheel and comprise a plurality of sub-solar-detectors. The ampere meter is further configured to measure the individual output current of each sub-solar-detector, so as to find the specific sub-solar-detector generating the maximum output current or an expected output current. The posture of the specific sub-solar-detector can be used to represent the arrangement of the solar detector.

Optionally, the solar detector can be a simple solar panel and its tilt posture can be adjusted by a second motor. By adjusting the tilt angle of the solar detector and measuring the output current at different tilt angles, the tilt angle of the solar detector can be directly used to determine the favorable tilt angle of the plurality of solar cells.

Optionally, the window blind can further comprise a memory to record the relationship between time and the optimal arrangement of the solar detector. The recorded relationship is helpful to adjust the posture of the plurality of solar cells.

It is another object, according to an embodiment of the present invention, to make the window blind provide illumination based on a predefined profile, the latter defining the relationship between time and an expected light intensity of a predefined area.

Optionally, the window blind can further comprise a light sensor, which is configured to measure the light intensity of the predefined area, and a second memory, which is configured to store the predefined profile. The motor is further configured to adjust the tilt angle of the plurality of solar cells, based on the output of the light sensor and the pre-defined profile.

Optionally, the window blind can further comprise an energy storage for storing the converted electricity. The energy storage can be arranged so as to be distributed in one or more slats, which means that the obtained energy is locally stored inside one or more slats. The energy storage can also take place in a centralized way, physically independent of the window blind. The stored electricity can be provided to a light source to illuminate the predefined area or to any appliance in the house.

These and other aspects, features, and/or advantages of the present invention will be apparent from and elucidated with reference to the embodiments described hereinafter.

BRIEF DESCRIPTION OF THE DRAWINGS

For a more complete understanding of the present invention, and the advantages thereof, the following descriptions refer to the accompanying drawings, in which.

Throughout the drawings, same or similar reference numerals will be understood to represent the same or similar modules, functions or features.

DETAILED DESCRIPTION OF THE EMBODIMENTS

Figure 1:
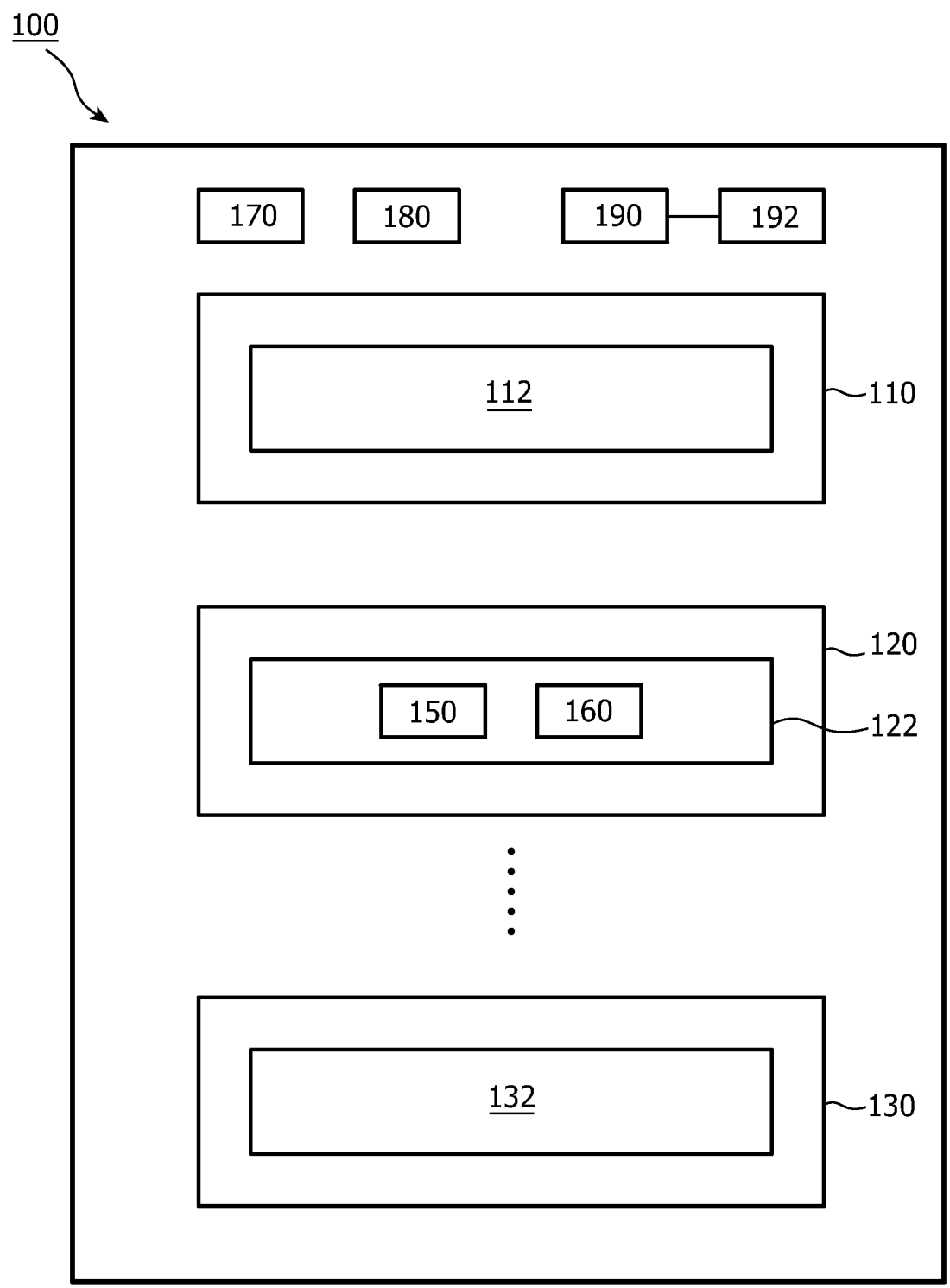
FIG. 1 illustrates a schematic window blind, according to embodiments of the present invention.

In the following description, FIG. 1 is used to illustrate several window blinds according to several embodiments of the present invention, and different modules will be described in detail accompanying with different embodiments. Incorporating all modules in one figure is just for the simplicity of the description, and should not be understood that each module in FIG. 1 is essential for the present invention.

In the first embodiment shown in FIG. 1, a window blind 100 comprises a plurality of slats 110, 120, and 130 and a plurality of solar cells 112, 122, and 132. Each solar cell is configured to collect solar energy and convert it into electricity. Each solar cell can be mounted on a corresponding slat, and the mount can be rigid, which means that the movements of the slat and the solar cell are synchronous, or the mount can be flexible, which means that the movements of the slat and the solar cell can be asynchronous. In the latter situation, the posture of each solar cell can be adjusted independent of the posture of the corresponding slat. Each solar cell can be a solar panel with different size. For example, each solar cell may have a comparative size as that of the slat it is mounted on, or several solar cells may be mounted on one slat. Also, it is not necessary for each slat to have a solar cell mounted on it. The window blind 100 further comprises a solar detector 150, which is configured to collect solar energy and convert it into electricity. The solar detector 150 can be a solar panel independent of the plurality of solar cells 112, 122, and 132. The size and shape of the solar detector 150 can be different from a single solar cell 112, 122, and 132, or it may have the same or similar size and shape as a single solar cell 112, 122, or 132. However, for the benefit of ease-of-description, we can virtually separate the solar detector 150 from the plurality of solar cells 112, 122, and 132, in this case. An ampere meter 160 is provided to measure the output current of the solar detector 150 to find an optimal arrangement of the solar detector 150 corresponding to the maximum output current or an expected output current. In this embodiment, the ampere meter 160 measures the output current from the solar detector. If in some cases, there are some circuits/modules that convert the output current to, and present it in the form of, a voltage, a voltage meter is also applicable for the present invention. The solar detector 150 and the ampere meter 160 together determine the optimal arrangement of the solar detector 150 responding to the incidence angle of sunlight. The arrangements of the solar detector 150 can include the posture, shape, or any other measurement to describe the arrangement of the solar detector 150. The window blind 100 further provides a motor 170 to adjust the posture, e.g., tilt angle, of the plurality of solar cells, based on the optimal arrangement of the solar detector 150. If each solar cell 112, 122, 132 is rigidly mounted on a corresponding slat 110, 120, 130, the motor can adjust the posture, i.e., tilt angle, of each slat to further adjust the posture of each solar cell. If each solar cell 112, 122, 132 is flexibly mounted on a corresponding slat 110, 120, and 130, the motor can directly adjust the posture of each solar cell or adjust both the slats and the solar cells.

By measuring the output current of the solar detector 150, based on its different arrangements, an optimal arrangement corresponding to the maximum output current or an expected output current can be determined. The optimal arrangement can be further used to determine the arrangement, e.g., tilt angle, of the plurality of solar cells, which may further provide a maximum current or a second expected current. This function is performed autonomously, without the intervention by operators.

The solar detector 150 may be placed at different postures. In an embodiment, the solar detector 150 is placed at a substantially central area of the region formed by the plurality of solar cells, which may closely reflect the influence of the incidence angle of sunlight on the solar-to-electricity conversion of the plurality of solar cells. In other embodiments, the solar detector 150 may be placed at an edge of the window blind, which is advantageous for installation.

No matter where and how the solar detector 150 is mounted, the ampere meter 160 may be closely coupled to the solar detector 150, which provides the benefit of a compact module, or loosely coupled to the solar detector 150, e.g., by electrical wire, which provides the benefit of convenient installation.

Figure 2:
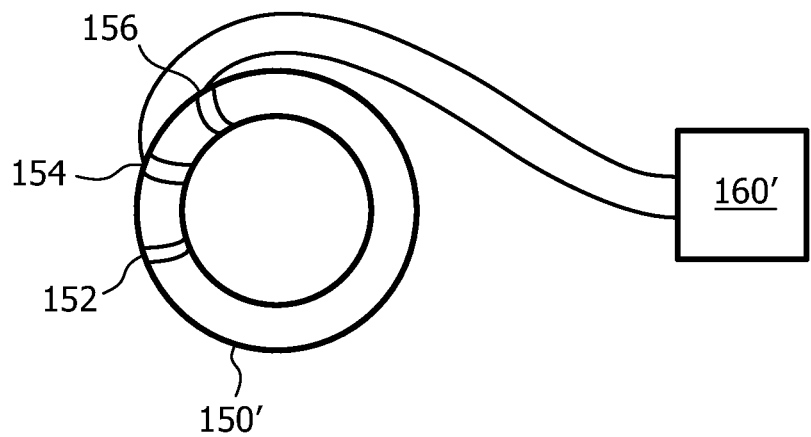
FIG. 2 illustrates an exemplary solar detector and ampere meter according to an embodiment of the present invention.

FIG. 2 illustrates an exemplary embodiment of the solar detector 150' according to an embodiment of the invention. The solar detector 150' is formed in the shape of a wheel and comprises a plurality of sub-solar-detectors 152, 154, and 156, wherein each sub-solar-detector is capable of collecting solar energy and converting it into electricity independently. The ampere meter 160' is further configured to measure the output current of each sub-solar-detector so as to find a specific sub-solar-detector generating the maximum output current or an expected output current. The arrangement, e.g., posture or index, of the specific sub-solar-detector 152, 154, or 156, can be used to represent the arrangement of the solar detector 150'. A skilled person should understand that, in all embodiments of the present invention, the optimal arrangement of the solar detector should not be limited to the posture corresponding to the maximum output current, but also can be a posture corresponding to an expected output current. The first case is for collecting maximum energy, while the latter case may be for generating the demanded current depending on specific applications.

Figure 3:
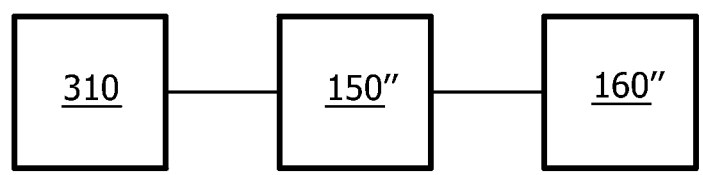
FIG. 3 illustrates an exemplary solar detector and ampere meter according to an embodiment of the present invention.

Alternatively, FIG. 3 illustrates an exemplary embodiment of the solar detector 150", which can be a flat solar panel and its tilt angle can be adjusted by a second motor 310. By adjusting the tilt angle of the solar detector 150", the output current measured by the ampere meter 160" can be changed. Subsequently, the optimal arrangement of the solar detector 150" can be determined.

As known, there is some inherent relationship between the time and the incident angle of sunlight. And the inventors found that there are different kinds of relationships between the time and the favorable arrangement of the solar detector. The latter can be influenced by the incident angle of sunlight.

Figure 4:
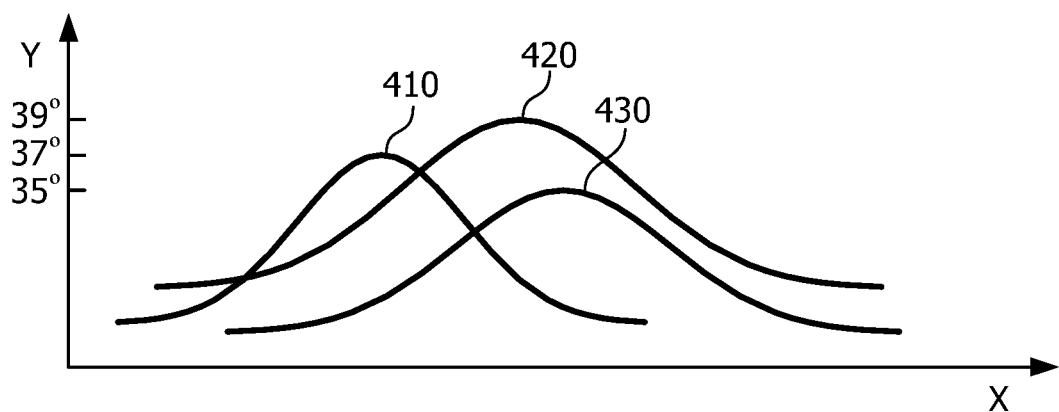
FIG. 4 illustrates a figure representing the relationships between the tilt angle of the plurality of solar cells and the time, according to embodiments of the invention.

Optionally, the relationship between time and arrangement of the solar detector 150 can be stored in a memory 180, which is illustrated in FIG. 4. For example, the arrangement of the solar detector 150 can be its tilt angle or the index/posture of the specific sub-solar-detector. In the embodiment of FIG. 4, the X axis represents the time, and the Y axis represents the tilt angle of the solar detector. Each curve is basically a plot of the optimal arrangement of the solar detector during the day. Due to the revolution of the Earth around the Sun, the incident angle of sunlight may even be different at the same time of a different day. Therefore it is practical for the memory 180 to store several curves, each curve representing a specific season or month. For example, curve 410 represents the spring, curve 420 represents the summer, while curve 430 represents the winter.

The motor 170 in an embodiment of FIG. 1 can be further configured to adjust the tilt angle of the plurality of solar cells, by taking into account the current time and the relationship stored in the memory 180.

One main function of a window blind is letting the sunlight pass through and illuminate a predefined area. It is another object, according to an embodiment of the present invention, to make the window blind provide illumination based on a predefined profile, the latter defining the relationship between time and an expected light intensity of a predefined area. To reach this object, the window blind 100, in an embodiment illustrated in FIG. 1, can further comprise a light sensor 190, configured to measure the light intensity of a predefined area, and a second memory 192, configured to store a pre-defined profile that defines the relationship between time and a desired light intensity of the predefined area. The motor 170 is further configured to adjust the tilt angle of the plurality of solar cells based on the output of the light sensor 190 and the pre-defined relationship stored in the second memory 192. For example, the user wants the predefined area to have a higher light intensity at a specific time: while the light sensor 190 detects that the current light intensity is lower than expected, the motor 170 may adjust the tilt angle of the plurality of solar cells 112, 122, and 132 to collect and convert more solar energy into electricity and provide it to a light source to compensate the insufficient light intensity. The light source may be an independent lamp in the room or a plurality of LEDs coupled to the window blind, compensating the light intensity passing through the window blind. In the latter scenario, each slat may be, or comprise, a transparent and light-conductive material, for example, a light guide plate made of PMMA (Polymethyl Methacrylate).

If the light sensor 190 detects that the light intensity is higher than expected, the motor 170 may adjust the tilt angle of the plurality of solar cells to reduce the converted solar energy, which may reduce the output light intensity of the light source or even power off the light source.

To store the converted electricity, the window blind may further comprise an energy storage. The stored energy can be supplied to the light source or any other appliances. Also, the stored energy can be supplied to the mains grid, where it can be used in the same way as the electricity generated and transmitted by the electricity grid.

Those skilled in the art would appreciate that various modifications are possible in the method and apparatus thereof provided in various embodiments of the invention without departing the spirit or scope of the invention. Therefore, the scope of the invention should be construed by the appended claims.

The remarks made hereinbefore demonstrate that the detailed descriptions with reference to the drawings illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A window blind, comprising:
    a plurality of slats, each slat of the plurality of slats having an adjustable tilt angle;
    a solar detector, configured to collect solar energy;
    an ampere meter, configured to measure the output current of the solar detector;
    a plurality of solar cells, each solar cell of the plurality of solar cells mounted on a corresponding slat of the window blind to collect solar energy, and each solar cell of the plurality of solar cells having a tilt angle adjustable independently of a tilt angle of the corresponding slat; and
    a first motor, configured to adjust a tilt angle of at least one of the plurality of solar cells relative to the tilt angle of the corresponding slat based on the tilt angle of the corresponding slat and the measured output current of the solar detector.

2. The window blind as claimed in claim 1, wherein the solar detector is placed at a substantially central area of the region formed by the plurality of solar cells.

3. The window blind as claimed in claim 1, wherein the solar detector is formed in the shape of a wheel and comprises a plurality of sub-solar-detectors, and the ampere meter is configured to measure an individual output current of each sub-solar-detector so as to find a specific sub-solar-detector generating a maximum output current.

4. The window blind as claimed in claim 1 further comprising:
    a second motor, configured to adjust the tilt angle of the solar detector to find an optimal tilt angle of the solar detector corresponding to the maximum output current.

5. The window blind as claimed in claim 1 further comprising:
    an energy storage, configured to store energy collected by the plurality of solar cells.

6. The window blind as claimed in claim 5, further comprising a lighting source, wherein the energy storage is further configured to provide energy to the lighting source to illuminate a predefined area located external to the blind.

7. The window blind as claimed in claim 1 further comprising:
    a first memory, configured to record a relationship between a time and an optimal orientation of the solar detector, the optimal orientation of the solar detector representing a favorable tilt angle of the solar detector or a specific sub-solar-detector of the solar detector where the solar detector comprises multiple sub-solar-detectors and the ampere meter is configured to measure the individual output current of each sub-solar-detector.

8. The window blind as claimed in claim 7, wherein the first motor is further configured to adjust the tilt angle of the at least one of the plurality of solar cells according to a current time and the relationship stored in the first memory.

9. The window blind as claimed in claim 7 further comprising:
    a light sensor, configured to measure a light intensity of a predefined area located external to the blind;
    a second memory, configured to store a pre-defined profile between time and a desired light intensity of the pre-defined area; and
    a second motor configured to adjust the tilt angle of at least one of the plurality of slats based on the output of the light sensor and the pre-defined profile stored in the second memory.

10. The window blind as claimed in claim 1 further comprising:
    a light sensor, configured to measure the light intensity of a predefined area located external to the blind;
    a second motor configured to adjust the tilt angle of at least one of the plurality of slats based on the output of the light sensor.

11. The window blind as claimed in claim 10 further comprising:
    a first memory, configured to store a pre-defined profile between time and a desired light intensity of the pre-defined area;
    wherein the second motor is further configured to adjust the tilt angle of the at least one of the plurality of slats based on the output of the light sensor and the pre-defined profile stored in the first memory.

12. The window blind as claimed in claim 11 further comprising:
    an energy storage, configured to store energy collected by the plurality of solar cells; and a lighting source,
wherein the energy storage is further configured to provide energy to a lighting source to illuminate the predefined area.

13. The window blind as claimed in claim 12 wherein the lighting source is configured to provide light based on the output of the light sensor and the pre-defined profile stored in the first memory.

\* \* \* \* \*